United States Patent
Kestly et al.

(10) Patent No.: US 7,111,505 B2
(45) Date of Patent: *Sep. 26, 2006

(54) MULTI-LAYER STEEL CYLINDER HEAD GASKET WITH INTEGRATED PRESSURE SENSOR

(75) Inventors: Michael J. Kestly, Danville, KY (US); Frank W. Popielas, Plainfield, IL (US); Jeffery A. Foster, North Aurora, IL (US); James S. Pietraski, Plainfield, IL (US); Lawrence E. Peck, Wadsworth, IL (US); James T. Mikos, Westchester, IL (US)

(73) Assignee: Dana Corporation, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/504,804

(22) PCT Filed: Feb. 14, 2003

(86) PCT No.: PCT/US03/04353

§ 371 (c)(1),
(2), (4) Date: Feb. 15, 2005

(87) PCT Pub. No.: WO03/071167

PCT Pub. Date: Aug. 28, 2003

(65) Prior Publication Data
US 2005/0115311 A1 Jun. 2, 2005

Related U.S. Application Data

(60) Provisional application No. 60/396,532, filed on Jul. 16, 2002.

(51) Int. Cl.
*G01L 3/26* (2006.01)
*G01M 15/00* (2006.01)

(52) U.S. Cl. ...................................................... 73/115
(58) Field of Classification Search .................... None
See application file for complete search history.

(56) References Cited

U.S. PATENT DOCUMENTS 4,822,294 A    4/1989   McClearn (Continued)

OTHER PUBLICATIONS

International Search Report dated Dec. 12, 2003 for application No. PCT/US03/04353.

*Primary Examiner*—Eric S. McCall
*Assistant Examiner*—Octavia Davis
(74) *Attorney, Agent, or Firm*—Radar, Fishman & Grauer PLLC

(57) ABSTRACT

A multi-layer steel (MLS) cylinder head gasket containing fully integrated pressure sensors includes first and second metal layers with inner facing surfaces, and a spacer layer interposed between the facing surfaces. Outer (non-facing) surfaces of the first and second metal layers each include an elastomeric seal coating; the inner surfaces of the layers each include a friction reducing coating. Combustion apertures extend fully between the outer surfaces of the gasket, and are adapted to circumscribe cylinder bores of an engine. The spacer layer includes protective slots positioned adjacent each of the combustion apertures. Each slot wall contains a pressure sensor in form of a strain gauge to measure deflection of the wall resulting from pressure changes within engine combustion chambers. The measured deflections are correlated to actual pressures within the chambers. In the protective slots, the strain gauges are not exposed to combustion gases that could otherwise foul the sensors.

27 Claims, 4 Drawing Sheets

U.S. PATENT DOCUMENTS

| | | |
|---|---|---|
| 5,195,365 A | 3/1993 | Chujo et al. |
| 5,380,014 A | 1/1995 | Schaperkotter |
| 5,495,137 A | 2/1996 | Park et al. |
| 5,529,346 A | 6/1996 | Sperring |
| 5,659,132 A | 8/1997 | Novak et al. |
| 5,938,963 A | 8/1999 | Tanis |
| 6,161,520 A | 12/2000 | Clarke |
| 6,532,737 B1 | 3/2003 | Kozerski et al. |
| 6,682,075 B1 * | 1/2004 | Gottel .................. 277/317 |
| 6,739,183 B1 * | 5/2004 | Kestly .................... 73/115 |

* cited by examiner

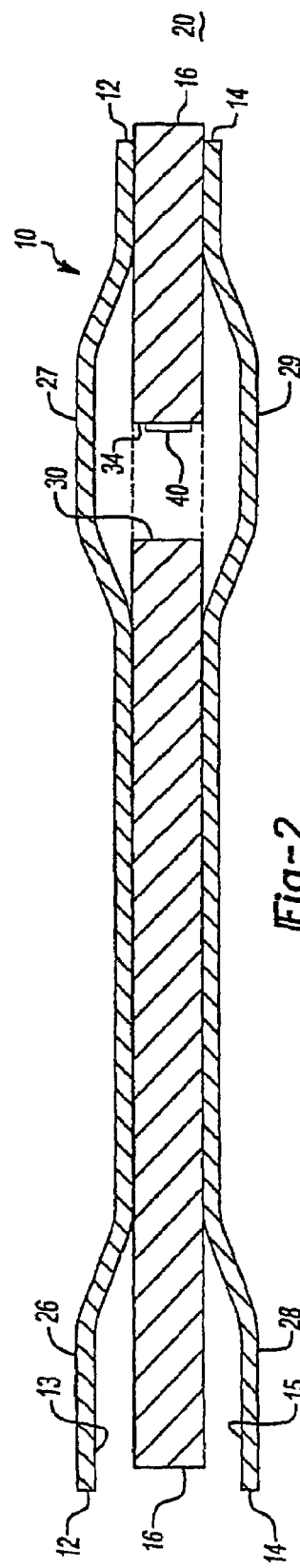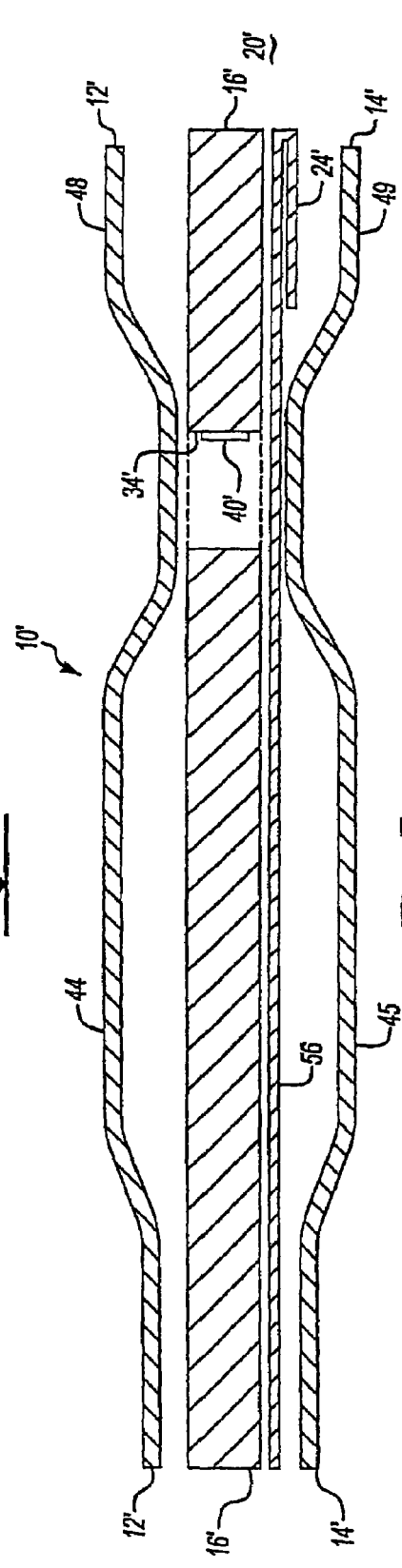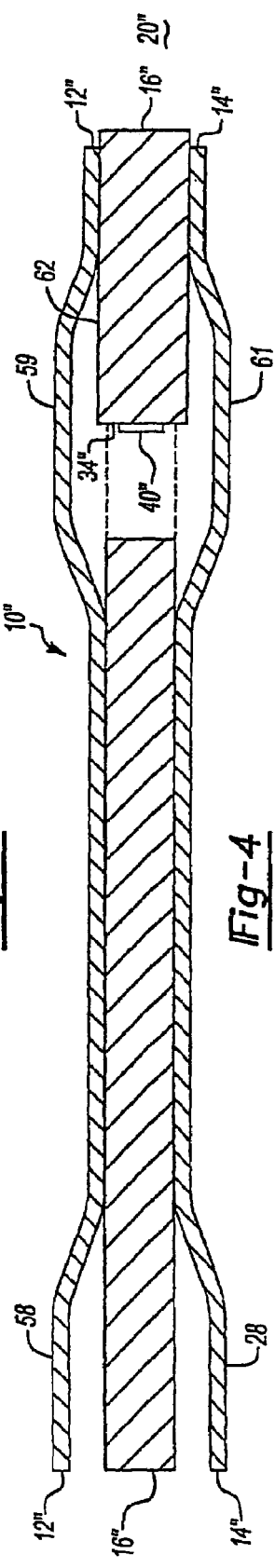

MULTI-LAYER STEEL CYLINDER HEAD GASKET WITH INTEGRATED PRESSURE SENSOR

BACKGROUND OF THE INVENTION

1. Field of Invention

The present invention relates generally to apparatus embedded in and or applied to gasket structures, and particularly to sensing apparatus applied to combustion gaskets of internal combustion engines. More specifically, the invention relates to pressure sensing apparatus for measuring pressure levels of combustion gases that are provided within structures of cylinder head combustion gaskets.

2. Description of the Prior Art

It is known to employ electronic sensors in gaskets for sealing between engine components including, for example, the block and cylinder head of a multi-cylinder internal combustion engine. In one such case, the gasket comprises a sealing plate having several combustion chamber orifices, with combustion chamber sealing elements situated on the edges of the sealing plate surrounding the combustion chamber orifices. The gasket includes sensor elements for cylinder-specific detection of sealing movements perpendicular to the plane of the sealing plate, caused by pressure changes in respective combustion chambers being measured. All of the sensor elements are arranged outside of the combustion chamber sealing elements, and can be piezoelectric and piezoresistive, as well as glass fiber light guide-style sensors.

In another example, a gasket enclosed sensor system is employed for measurement of combustion chamber parameters and delivery of signals to points external of the engine. The gasket includes a combustion opening substantially surrounding a combustion chamber, and includes an access opening extending from the combustion chamber to a point external of the engine. A metallic sensor terminal is positioned within the access opening, and insulating material substantially surrounds the metallic sensor terminal.

In yet another example, a fluid sensor and associated circuitry are used to indicate presence of oil flow in a multi-cylinder internal combustion engine. The oil sensor includes a heating element positioned within the oil line, directly in the oil flow path. A comparator measures the value of signals from upstream and downstream heat sensors, and triggers a switching circuit when the temperature at the sensors approach one another to indicate an adequate oil flow to the engine.

In still another example, a gasket formed in the shape of an exhaust flange includes a load sensor comprising a pressure sensitive electrically resistive material positioned between electrodes and conductors extending outwardly of the perimeter of the gasket. A seal provided between first and second layers of the gasket, and about the load sensor, provides a seal for the electrodes, which are positioned in a cavity to protect the sensor from fluids.

SUMMARY OF THE INVENTION

The present invention is directed to a multi-layer steel (MLS) cylinder head gasket containing at least one fully integrated pressure sensor. The gasket comprises first and second steel metal layers having inner and outer surfaces, with their inner surfaces substantially facing one another. A third metal layer acts as a spacer layer; the spacer layer is interposed between and contacts the inner surfaces of the first and second layers. In the described embodiment, the outer surfaces of the first and second layers include an elastomeric seal coating, while the inner surfaces of the first and second layers include a friction reducing coating.

The cylinder head gasket further includes combustion apertures that extend through each of the three described layers, thus contiguously between the outer surfaces of the first and second metal layers. The combustion apertures circumscribe the cylinder bores. The gasket also includes pressure sensors, for example strain gauges that are provided with protective slots formed in the spacer layer adjacent to but spaced from each of the combustion apertures. Once the gasket has been installed between a cylinder head and engine block, the strain gauges are adapted to measure deflection of a wall of each of the slots resulting from pressure changes occurring within the combustion chambers. For this purpose, the measured strains are correlated to pressure changes within the combustion chambers to generate an appropriate electric signal.

One particular advantage of the disclosed MLS gasket is that the strain gauges are not directly exposed to combustion gases that might otherwise foul the sensor. As disclosed, the sensor is adhesively contained on an arcuate wall of the described protective slot. Sensor wires are attached to the strain gauges; the wires are carried in grooves formed into at least one spacer layer. Various methods for forming the groove are available. For accommodating a plurality of cylinders, wires from each cylinder bore are bundled into a common groove of the spacer layer. In an alternately described embodiment, the spacer layer can extend beyond the normal boundary of the gasket. Thus, the spacer layer may be extended radially outwardly of a conventional gasket component perimeter in environments where such extension may be useful or desirable. Finally, a converter may be employed to change optical signals into electrical signals for appropriate transmittal to a microprocessor of an engine control module, if for example an optical strain gauge is employed.

BRIEF DESCRIPTION OF THE DRAWINGS

FIGS. 2 through 4 are cross-sectional views of three described alternative embodiments of a cylinder head gasket that incorporates the sensor system of the present invention.

DETAILED DESCRIPTION OF EMBODIMENTS

Figure 1:
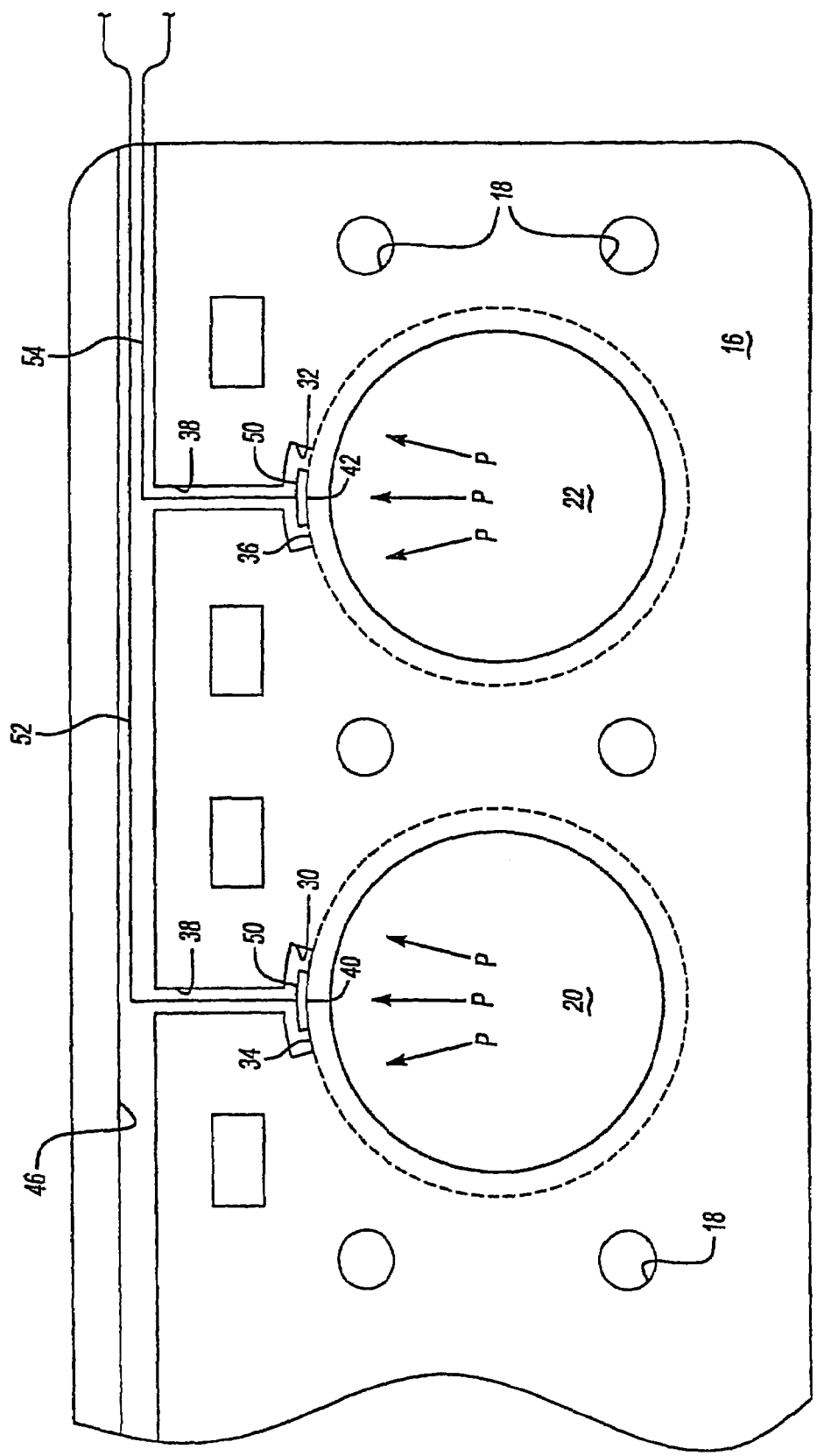
FIG. 1 is a plan view of a spacer layer of one described embodiment of an MLS cylinder head gasket that incorporates a pressure sensor system in accordance with the present invention, each sensor defined by a strain gauge disposed on an arcuate wall of a slot within the layer.

Referring initially to FIGS. 1 and 2, a first described embodiment of a cylinder head gasket 10 incorporates integral pressure sensor apparatus adapted to measure pressures in a combustion chamber. The gasket 10 is shown fragmentarily, and includes a pair of exterior mirror image layers 12 and 14, as well as a center spacer layer 16 interposed between the layers 12 and 14. The described gasket 10 is a multi-layer steel (LS) gasket, although this invention is not limited to so-called MLS gaskets; indeed, the material can be of a metal other than steel. The gasket 10 also includes a plurality of spaced bolt apertures 18, as shown, for securement of the three layered structure of the gasket 10 into proper sealing alignment with combustion bores (not shown) situated between a cylinder head and an engine block (neither shown). The gasket 10 includes a plurality of combustion bore apertures of which only two apertures, 20 and 22, are shown in FIG. 1.

Referring now particularly to FIG. 1, the pressure sensing apparatus is now described in detail. A first slot 30 and an identical second slot 32 are shown positioned respectively adjacent combustion bore apertures 20 and 22. Those skilled in the art will appreciate that the same arrangement is applied to other bores not shown in the fragmentary rendition of the gasket 10 in FIG. 1. Each of the slots 30, 32 contains a wall 34, 36, respectively, that is spaced from but adjacent the edges of combustion bores 20, 22. Adhesively attached to each of the walls 34, 36 is a strain gauge 40, 42 that has its longitudinal orientation extending along a circumferential arc within the slot 30, 32. The adhesive employed in the described embodiment is a high temperature adhesive of the type employed in internal combustion engines.

Figure 5:
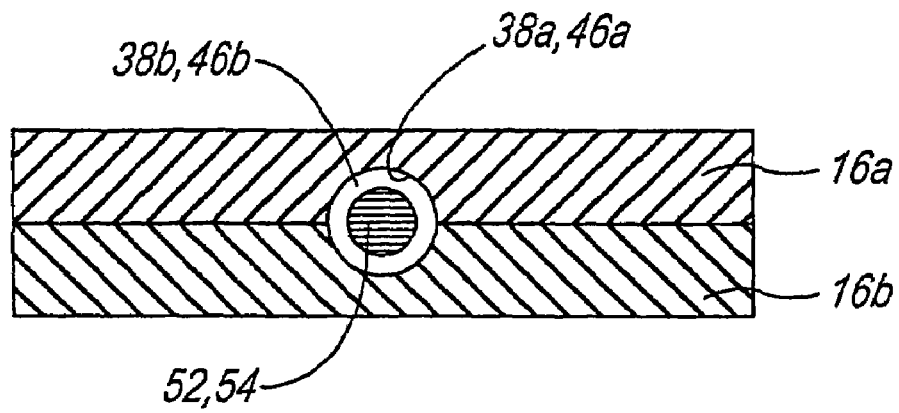
FIG. 5 is a cross-sectional view of an alternative embodiment of the groove for positioning the sensor apparatus.

Adhesively applied to each strain gauge 40, 42 is a sensor harness 50 that is adapted to measure movement of strain gauge 40, 42, and to transmit the movement as a signal through the sensor harness 50 and into sensor wires 52,54, respectively. The sensor wires 52,54 are positioned in channels 38 that extend radially outwardly from the slots 30, 32, and that intersect a channel 46 at the border or edge of the spacer layer 16, as shown. The method of forming channels 38 and 46 is described in greater detail below. Finally, the invention contemplates that the channels are formed entirely within the spacer layer 16, so that the pressure sensor apparatus described may be fully contained within the spacer layer 16. Alternatively, referring to FIG. 5, instead of a single spacer layer 16, being provided with channels 38 and 46, spacer layer 16 is split into two layers 16a and 16b that are positioned adjacent to one another. Each of the layers 16a and 16b are provided with a channel 38a, 38b and 46a and 46b, respectively, wherein the depth of each channel is preferably about half of the thickness of the sensor wires 52, 54.

Referring now particularly to FIGS. 2 through 4, those skilled in the art will note that three separate embodiments of the gasket 10 are displayed, and that FIGS. 2 through 4 do not display wiring harnesses nor channels (FIG. 1) for reasons of convenience. Referring initially to FIG. 2, it will be appreciated that the exterior mirror image layers 12 and 14 contain a series of mated upper and lower embossments or half beads 26, 28 at one end, and upper and lower full beads 27 and 29 near the combustion bore 20. In FIG. 3, the layers 12' and 14' contain full beads 44 and 45 along an intermediate portion of the cross-section, while containing half beads 48 and 49 at the combustion bore aperture 20'. The embodiment of FIG. 3 also includes a fourth layer 56 that contains a stopper foldover layer 24, which is shown as a stopper annulus (also 24) in FIG. 1.

The embodiment of FIG. 4 is somewhat similar to that of FIG. 2, with respect to embossments of the exterior mirror image layers 12" and 14". Specifically, the embodiment of the gasket 10" incorporates a pair of half beads 58 and 60, that are analogous to the half beads 26 and 28 of the gasket 10 of FIG. 2. Moreover, the gasket 10" also contains a pair of full beads 59 and 61 that are situated similarly to the full beads 27 and 29 of the gasket 10. However, the gasket 10" incorporates a combustion ring 62 separate from the spacer layer 16". This singular ring 62 is situated radially adjacent each combustion opening (shown at 20"), and is thicker than the spacer layer 16" (e.g. in the range of 0.08–0.15 mm" as compared to the spacer layer thickness of approximately 2 mm) to thus provide a so-called stand over or stopper effect at the combustion opening 20" in the absence of an actual stopper (e.g. the foldover stopper 24 of FIG. 3).

In the described embodiments, the exterior mirror image layers 12 and 14 of each design are constructed of spring steel with mechanically die formed embossments, i.e. the beads and half beads described. The mirror image layers are typically made of 301 stainless-steel and may be of half hardness or full hardness temper. Alternatively, they may be formed of high-strength steel alloys. In each case, it is contemplated that the outer surface of the layers 12 and 14 are coated with an elastomer seal coating such as one containing silicone or fluoroelastomer (e.g., FKM), as will be appreciated by those skilled in the art. On the other hand, a friction reducing coating is applied to the inner surfaces 13, 15 of the layers 12, 14. To the extent that the surfaces 13, 15 face one another and thus are adapted to engage the spacer layer 16, the contact friction forces of the inner surfaces of the gasket are designed so as not to impede the strain generation at the strain gauge location. Friction reducing coatings such as moly disulfide, polytetrafluoroethylene, or silicone power coatings can be used on surfaces 13, 15 for this purpose.

Figure 6:
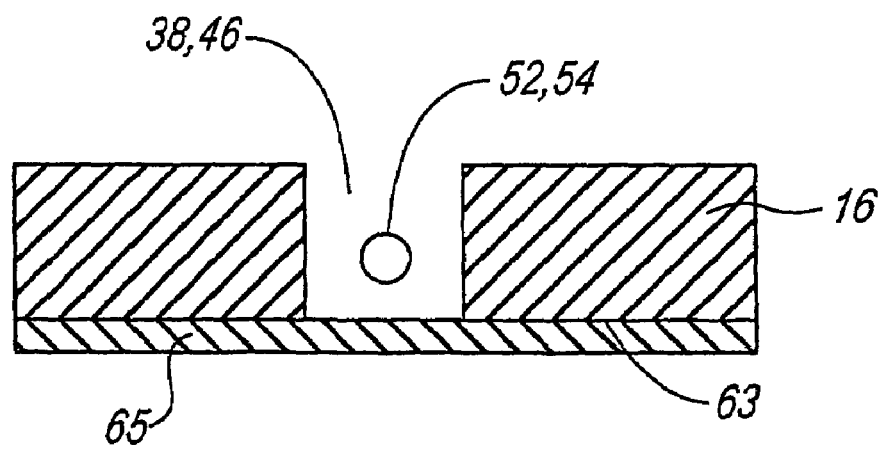
FIG. 6 is a cross-sectional view of another alternative embodiment of the groove formed in the spacer layer of the gasket.

The process for manufacturing a spacer layer 16 having channels 38, 46 will be discussed. First, channels 38, 46 are rough cut into spacer layer 16. If channels 38, 46 are only formed in a single spacer layer 16, then at least one surface 63 of spacer layer 16 is preferably provided with a thin support layer 65, as shown in FIG. 6. Thin support layer 65 may be attached to spacer layer 16 by spot welding or other suitable method. Once the rough cut channel 38, 46 is formed, final shaping must be performed. Final shaping may be accomplished by either milling, saw blading a path, beading, or coining to the final shape.

Figure 7:
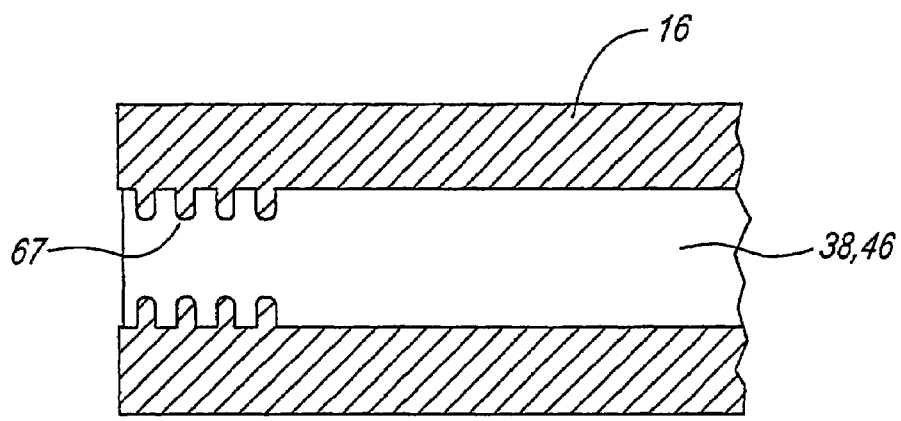
FIG. 7 depicts alternative embodiments to achieve adequate sealing of the sensor tube adjacent to a combustion bore opening.

Referring to FIG. 7, in another alternative embodiment, a portion of channels 38, 46 formed in spacer layer 16 may also be provided with a plurality of "teeth" 67 or threads to provided localized contact pressure on sensor wires 52,54 to retain sensor wires 52, 54 within channels 38, 46.

Figure 8:
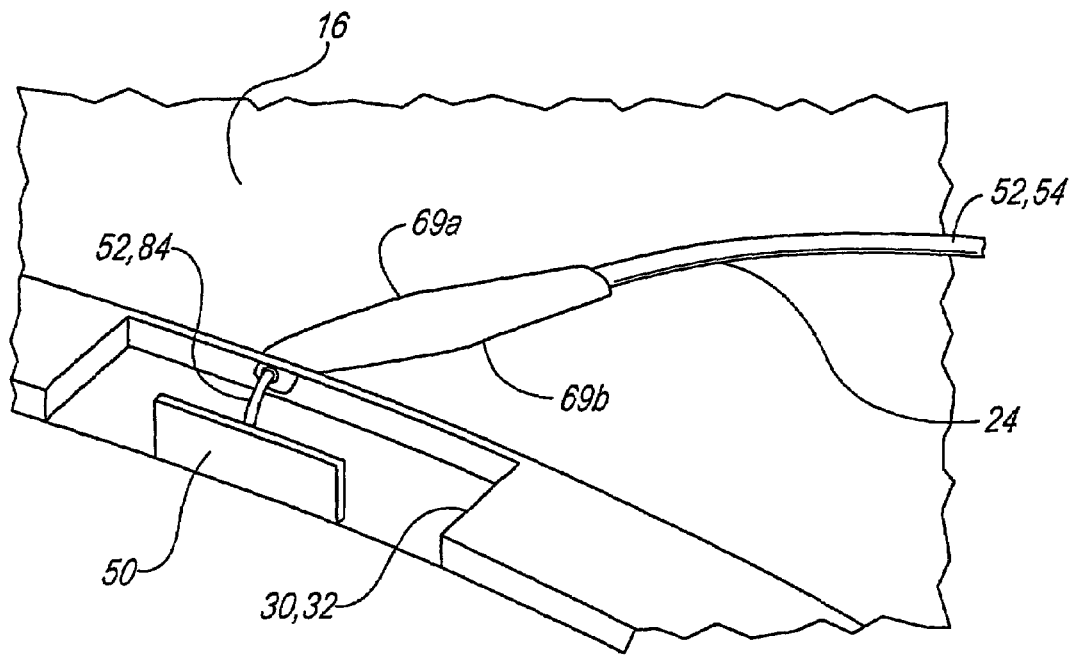
FIG. 8 is a perspective view of another embodiment showing a portion of sensor wires.

Referring to FIG. 8, in yet another alternative embodiment, a portion of sensor wires 52,54 may be provided with a triangular shaped sheath 69 such that edges 69a and 69b extend away from one another. In accordance with this aspect of the invention, sheath 69 is press fit into channel 38, thereby securing sensor wires 52, 54 within channel 38.

Those skilled in the art will appreciate that the above description illustrates that various design options may be suitable in a variety of gasket constructions, depending on a particular engine in which an appropriate sealing effect is to be achieved. Thus, it is to be understood that the above description is intended to be illustrative and not limiting. Many embodiments will be apparent to those of skill in the art upon reading the above description. For example, a gasket within the sensor elements and wires molded into the body of the gasket material would fall within the broader scope of this invention. Therefore, the scope of the invention should be determined, not with reference to the above description, but instead with reference to the appended claims, along with the full scope of equivalents to which such claims are entitled.

What is claimed is:

1. A multi-layer cylinder head gasket for sealing combustion chambers of an engine, the gasket comprising:

first and second metallic sealing layers, each of the sealing layers having inner and outer planar surfaces, wherein said inner planar surfaces substantially face one another;

a third metallic layer comprising at least one spacer layer interposed between said inner surfaces of said first and second layers; each of said three layers comprising at least one combustion aperture, and wherein each of the layers is sandwiched together so that the combustion apertures are concentrically aligned, and extend contiguously through the gasket layers between the outer surfaces of said sealing layers to collectively define a gasket combustion aperture adapted to circumscribe one of the combustion chambers of an engine;

said spacer layer further comprising a second opening spaced from but adjacent to said combustion aperture of that layer; wherein said opening is not in direct gaseous communication with said gasket combustion aperture; and said spacer layer further comprising a pressure sensing device attached to an interior wall of said second opening, said interior wall facing said gasket combustion aperture, said pressure sensing device adapted to measure deformation of said interior wall resulting from pressure changes occurring in the combustion chamber.

2. The multi-layer gasket of claim 1 wherein said second opening of said spacer layer comprises a protective opening defined by a slot that contains said wall.

3. The multi-layer gasket of claim 2, wherein said wall is an arcuate wall that is spaced from the combustion bore aperture of said spacer layer.

4. The multi-layer gasket of claim 3, wherein said gasket comprises a plurality of said cylinder bores, and wherein pressure sensing apparatus is provided near each bore for transmittal of cylinder-specific pressure level data to a real-time engine management system for optimization of engine performance parameters.

5. The multi-layer gasket of claim 4, wherein said pressure sensing device comprises a strain gauge.

6. The multi-layer gasket of claim 5, wherein said layers of said gasket comprise at least one beaded layer and wherein said beaded layers are concentrically registered with each other in said respective layers.

7. The multi-layer gasket of claim 6, wherein said at least one spacer layer comprises a surface channel adapted to receive a sensor connection wire.

8. The multi-layer gasket of claim 7, wherein a portion of said surface channel includes a plurality of teeth for gripping an outer surface of said sensor connection wire.

9. The multi-layer gasket of claim 7, wherein at least a portion of said sensor wire further includes a generally outwardly extending triangular shaped sheath such that said sheath must be press fit into said channel.

10. The multi-layer gasket of claim 6, wherein said at least one spacer layer includes a pair of spacer layers positioned adjacent to one another, each of said spacer layers having at least a partial channel formed therein such that the partial channels from the adjacent spacer layers cooperate to form a channel sized so as to receive at least a portion of a sensor connection wire.

11. A multi-layer cylinder head gasket for sealing combustion chambers of an engine, the gasket comprising:

first and second metallic sealing layers, each of the sealing layers having inner and outer planar surfaces, wherein said inner planar surfaces substantially face one another;

a third metallic layer comprising a spacer layer interposed between said inner surfaces of said first and second layers; each of said three layers comprising at least one combustion aperture, and wherein each of the layers is sandwiched together so that the combustion apertures are concentrically aligned, and extend contiguously through the gasket layers between the outer surfaces of said sealing layers to collectively define a gasket combustion aperture adapted to circumscribe one of the combustion chambers of an engine;

said spacer layer further comprising a second opening spaced from but adjacent to said combustion bore aperture of that layer; wherein said opening is not in direct gaseous communication wit said gasket combustion aperture; and said spacer layer further comprising a pressure sensing device attached to an interior wall of said second opening, said interior wall facing said gasket combustion aperture, said pressure sensing device adapted to measure deformation of said interior wall resulting from pressure changes occurring in the combustion chamber; wherein said first and second metallic sealing layers comprise a pair of beaded layers, each bead positioned symmetrically on said respective beaded layers.

12. The multi-layer gasket of claim 11 wherein said second opening of said spacer layer comprises a protective opening defined by a slot that contains said interior wall.

13. The multi-layer gasket of claim 12, wherein said slot comprises an arcuate wall that is spaced from the combustion bore aperture of said spacer layer.

14. The multi-layer cylinder head gasket of claim 13, further comprising a harness and at least one sensor connection wire, wherein said sensor connection wire terminates at said harness.

15. The multi-layer cylinder head gasket of claim 14, comprising a plurality of said cylinder bore apertures spaced apart within said gasket, each of said bore apertures being closely spaced from one of said pressure sensing devices responsive to said pressure levels of said combustion gases within that bore aperture, wherein each sensor is positioned on an arcuate wall of said respective slot.

16. The multi-layer cylinder head gasket of claim 15, wherein said wire is contained within channels positioned in said spacer layer, wherein said channels are radially oriented away from said slots.

17. The multi-layer gasket of claim 16, wherein a portion of said channels include a plurality of teeth for gripping an outer surface of said wires.

18. The multi-layer gasket of claim 16, wherein at least a portion of said wire further includes a generally outwardly extending triangular shaped sheath such that said sheath must be press fit into said channel.

19. The multi-layer gasket of claim 16, wherein said at least one spacer layer includes a pair of spacer layers positioned adjacent to one another, each of said spacer layers having at least a partial channel formed therein such that the partial channels from the adjacent spacer layers cooperate to form a channel sized so as to receive at least a portion of said sensor connection wires.

20. The multi-layer cylinder head gasket of claim 16, wherein said pressure sensing devices comprise strain gauges.

21. A multi-layer cylinder head gasket for sealing combustion chambers of an engine, the gasket comprising:
- first and second metallic sealing layers, each of said sealing layers having inner and outer planar surfaces, wherein said inner planar surfaces substantially face one another;
- at least one spacer portion interposed between said inner surfaces of said first and second layers; each of said layers including at least one combustion aperture, and wherein each of said layers is sandwiched together so that said combustion apertures are concentrically aligned, and extend contiguously through said gasket layers between the outer surfaces of said sealing layers to collectively define a gasket combustion aperture adapted to circumscribe one of the combustion chambers of an engine;
- said spacer portion further including a second opening spaced from but adjacent to said combustion aperture;
- said spacer portion further including a pressure sensing device in communication with an interior wall of said second opening, said interior wall facing said gasket combustion aperture, said pressure sensing device adapted to measure pressure changes occurring in the combustion chamber; and
- a sensor connection harness and at least one sensor connection wire in communication with said pressure sensing device for accommodating a transmittal of data to an engine management system.

22. The multi-layer gasket of claim 21, wherein said pressure sensing device comprises a strain gauge.

23. The multi-layer gasket of claim 21, wherein said layers of said gasket comprise at least one beaded layer and wherein said layers are concentrically registered with each other.

24. The multi-layer gasket of claim 21, wherein said at least one spacer portion includes a surface channel adapted to receive said sensor connection wire.

25. The multi-layer gasket of claim 24, wherein a portion of said surface channel includes a plurality of teeth for gripping an outer surface of said sensor connection wire.

26. The multi-layer gasket of claim 21, wherein at least a portion of said sensor wire further includes a generally outwardly extending triangular shaped sheath such that said sheath must be press fit into said channel.

27. The multi-layer gasket of claim 21, wherein said at least one spacer portion includes a at least two of spacer layers positioned adjacent to one another, each of said spacer layers having at least a partial channel formed therein such that the partial channels from the adjacent spacer layers cooperate to form a channel sized so as to receive at least a portion of said sensor connection wire.

* * * * *